United States Patent
Kim

(10) Patent No.: US 6,386,967 B1
(45) Date of Patent: May 14, 2002

(54) AIR VENTILATOR FOR AN AUTOMOBILE

(75) Inventor: Hyo Keun Kim, Kyoungki-do (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 09/753,761

(22) Filed: Dec. 29, 2000

(30) Foreign Application Priority Data

Sep. 16, 2000 (KR) .......................................... 00-54442

(51) Int. Cl.[7] ................................................. B60H 1/34
(52) U.S. Cl. ......................... 454/154; 454/155; 454/285
(58) Field of Search ................................ 454/154, 285, 454/155, 108, 109, 153

(56) References Cited

U.S. PATENT DOCUMENTS

| | | | |
|---|---|---|---|
| 3,333,522 A | * 8/1967 | Fadow | 454/153 |
| 3,481,534 A | * 12/1969 | Price | 415/146 |
| 4,521,153 A | * 6/1985 | Morimoto et al. | 415/146 |
| 5,433,661 A | * 7/1995 | Kim | 454/285 |
| 5,454,757 A | * 10/1995 | Wirfel | 454/336 |
| 5,588,910 A | * 12/1996 | Hutter et al. | 454/154 |

* cited by examiner

*Primary Examiner*—Jiping Lu
(74) *Attorney, Agent, or Firm*—Christie, Parker & Hale, LLP

(57) ABSTRACT

An air ventilator for ventilating cold or heated air into the interior of an automobile from a duct is provided. The air ventilator includes a pair of wing units having a plurality of wings fixed in various angles, a housing for receiving the wing units, and a gear mounted between the wing units and engaged to be driven by a motor to rotate the wing units simultaneously to automatically change the direction of ventilated air. The pair of wing units preferably have their wings twisted to direct air flow in opposite directions.

2 Claims, 2 Drawing Sheets

AIR VENTILATOR FOR AN AUTOMOBILE

CROSS-REFERENCE TO RELATED APPLICATION

This application claims priority of Korea patent Application No. 2000-54442, filed on Sep. 16, 2000.

BACKGROUND OF THE INVENTION

1. Field of the Invention

The present invention relates to an air ventilator for ventilating cold or heated air into the interior of an automobile from a duct comprising a pair of wing units having a plurality of wings fixed in various angles, housings for receiving said wing units, and a gear mounted between said wing units and rotated about their shafts simultaneously by a motor to change the direction of ventilated air automatically.

2. Information Disclosure Statement

In general, air cooled or heated in an air conditioning or heating system is supplied from a duct into the interior of an automobile through an air ventilator.

A plurality of wings are installed in the air ventilator to change the direction of air supply wherein a set of wings rotate horizontally while the second set of wings, being arranged next to the first set of wings, can rotate vertically. If necessary, an additional actuator can be mounted in order to change the direction of the air supply.

In the conventional air ventilator, however, once an angle of the wings is determined when the air conditioning system or the heater is operated, the direction of the air supply cannot be changed and the air is supplied in only one direction so that a driver has to manually adjust the direction of the air ventilator.

Also, in the conventional air ventilator, since the wings are not formed integrally, each wing has to be assembled by hand into the unit, respectively, during assembling process. This causes problems such as increases in assembling processes and parts.

Although the direction of air supply can be automatically changed in the conventional air ventilator having an additional actuator, said air ventilator also has a few drawbacks that its structure is quite complicated and expensive thus being inappropriate to be mounted in small to medium sized vehicles.

SUMMARY OF THE INVENTION

Therefore, in order to solve such problems as described above, an object of the present invention is to provide a ventilator for supplying cold or heated air into the interior of an automobile which can change the direction of air supply by automatically rotating both wing units.

The present invention comprises a pair of wing units, housings for receiving the wing units, and a gear for rotating the wing units simultaneously. In the present invention, each wing unit consists of an outer circular frame having blades formed on an outer circumference thereof, a center circular frame having a center aperture and a plurality of wings disposed radially from the center circular frame to the outer circular frame. The housing is divided into two spaces for mounting each wing units respectively, and consists of an inner housing located at the rear side of the wing unit, a support bar for fixing a shaft passed through the center aperture of the wing unit, and an outer cover combined with the inner housing along the edge and located in the front side of the wing unit. The gear is meshed with blades of the wing units and connected to a motor for simultaneously rotating the wing units.

The wings of each wing unit are divided into the first wing group and the second wing group according to the fixing angle. Since the wings are twisted with a certain angle so that an extension line in width direction of the each wing is not parallel with the shaft, a twisted direction of the wings of the first wing group is opposite to that of the wings of the second wing group. Therefore, the direction of air supply from the air ventilator is automatically changed according to the rotation of the wing units.

BRIEF DESCRIPTION OF THE DRAWINGS

For a better understanding of the nature and objects of the invention, reference should be had to the following detailed description taken in conjunction with the accompanying drawings in which.

Similar reference characters refer to similar parts throughout the views of the drawings.

DETAILED DESCRIPTION OF THE INVENTION

Figure 1A:
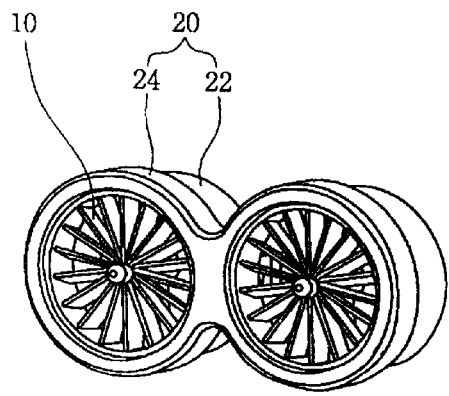
FIG. 1a and FIG. 1b are perspective views showing an air ventilator for an automobile according to the present invention.
Figure 1B:
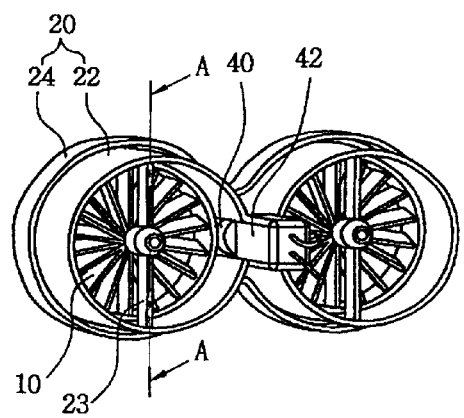
Figure 2:
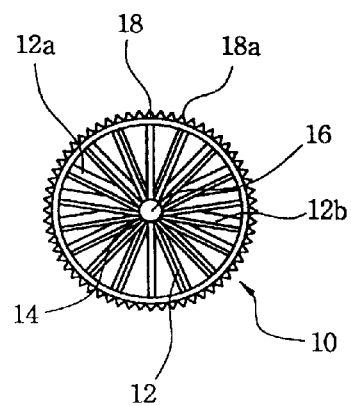
FIG. 2 is a front view of the first wing unit of the air ventilator for an automobile according to the present invention.

FIG. 1a and FIG. 1b are perspective views showing an air ventilator for an automobile according to the present invention, and FIG. 2 is a front view of the first wing unit of the air ventilator for an automobile according to the present invention.

Figure 3:
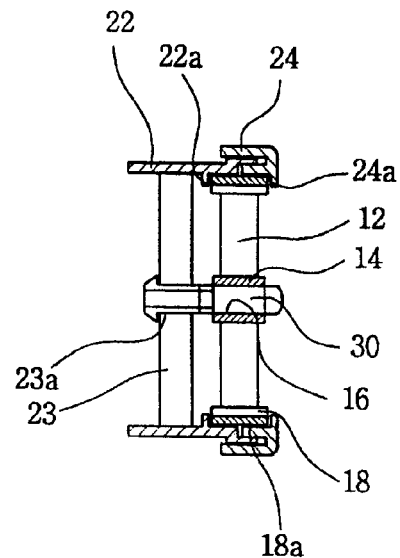
FIG. 3 is a sectional view taken along the line A—A in FIG. 1b.
Figure 4:
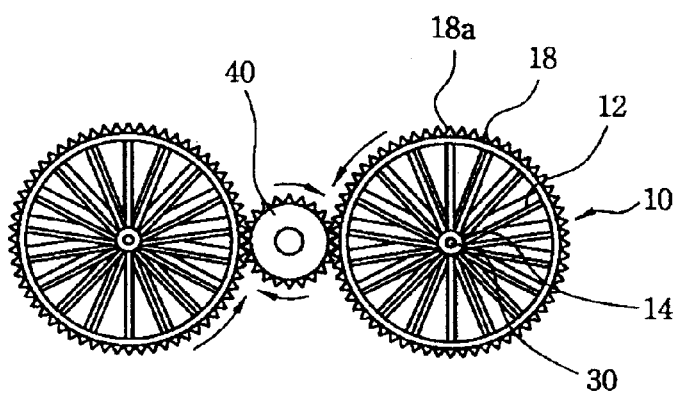
FIG. 4 is a view showing a rotating state of the wing units of the air ventilator of the present invention.

Also, FIG. 3 is a sectional view taken along the line A—A in FIG. 1b, and FIG. 4 is a view showing a rotating state of the wing units of the air ventilator of the present invention.

As shown in the figures, the air ventilator of the present invention comprises a pair of wing units 10. Each wing unit 10 consists of an outer circular frame 18, a center circular frame 14 and a plurality of wings 12 disposed radially. Both ends of the each wing 12 is fixed to an inner surface of the outer circular frame 18 and an outer surface of the center circular frame 14, respectively.

In an embodiment of the present invention, as shown in FIG. 3, the plurality of a wings 12 of each wing unit 10 are divided into the first wing group (12a; left side of FIG. 2) and the second wing group (12b; right side of FIG. 2) according to the fixing angle. As shown in FIG. 2 when the wings 12 are viewed from a front, the wings 12 are twisted with a certain angle. That is, an extension line in a width direction of each wing 12 is not parallel with a shaft to be received in the inner frame 14. Especially, a twisted direction of the wings of the first wing group 12a is opposite of that of the wings of the second wing group 12b. Therefore, the direction of air supply through the air ventilator is changed automatically according to the rotation of the wing units 10.

A shaft 30 is received in the inner frame 14 of each wing unit 10 so that the wing units 10 are rotated freely about the shaft 30.

In the air ventilator of the present invention, a pair of the wing units 10 are received in both right and left space of a housing 20, respectively. A gear 40 rotated by a motor 42 is mounted in the center space formed between the left and right spaces.

Blades 18a which are meshed with the gear 40 are formed on an outer circumference of the outer frame 18 of each wing unit 10 so that the wing units 10 are rotated in the opposite direction when the gear 40 is rotated.

In the present invention, the housing 20 is divided into spaces of the right and the left for receiving the two wing units 10 respectively and formed integrally.

Hereinafter, only one housing and the corresponding wing unit are described for convenience.

The housing 20 consists of an inner housing 22 located at the rear side of the wing unit 10 and an outer cover 24 located in the front side of the wing unit 10. In the housing 20, protrusions 22a and 24a are formed along edges of the inner housing 22 and the outer cover 24, respectively. The outer frame 18 of the wing unit 10 is received in a space between the protrusions 22a and 24a so that the outer frame 18 is guided when the wing unit 10 is rotated.

The shaft 30 is fixed in a fixing hole 23a of a support bar formed at the inner housing 22 passing through the center aperture 16 of the inner frame of the wing unit 10. That is, one end of the shaft 30 is fixed in the fixing hole 23a of the support bar and the shaft 30 is received in the center aperture 16 of the wing unit 10 and thus the wing unit 10 is freely rotated about the shaft 30 in the housing 20.

The motor 42 for rotating the gear 40 mounted at the rear end of the housing 20 is a low speed motor. A power supply for the motor is connected to a controller for an air conditioning or heating system to automatically operate them with a low speed.

Therefore, when a driver operates the air conditioning or heating system, the gear 40 is rotated by the motor 42 to rotate two wing units 10 at a low speed.

As described above, two wing units of the present invention are rotated about the shaft located between the wing units by means of the gear rotated by the motor to automatically change the direction of air supply so that a circulation of the cold or heated air in the interior of the automobile can be ventilated smoothly, and rapid and uniform air cooling or heating can be achieved with operation of the air conditioning or heating system. Also, it is possible to change the direction of air supply periodically and automatically without a manual operation of the air ventilator while driving for a driver's convenience. In addition, the present invention uses the wing units assembled integrally so that a number of the parts and assembling processes for the unit can be reduced.

Although this invention has been described in its preferred form with a certain degree of particularity, it is appreciated by those skilled in the art that the present disclosure of the preferred form has been made only by way of examples and that numerous changes in the details of the construction, combination, and arrangement of parts may be resorted to without departing from the spirit and the scope of the invention.

What is claimed is:

1. An air ventilator for ventilating air into the interior of an automobile, comprising a pair of wing units, a housing for receiving said wing units, and a gear, wherein each wing unit comprises an outer circular frame having blades on an outer circumference thereof, a center circular frame having a center aperture and a plurality of wings disposed radially from the center circular frame to the outer circular frame;

wherein said housing comprises two spaces for mounting the wing units respectively, and comprises an inner housing located at a rear side of one of said wing units, a support bar for fixing a shaft passed through the center aperture of said one wing unit, and an outer cover combined with the inner housing and located at a front side of said one wing unit;

wherein said gear is meshed with the blades of the wing units and connected to a motor for rotating the wing units simultaneously; and wherein said wings of each wing unit are divided into a first wing group and a second wing group, wherein the first and second wing groups are each twisted with at an angle so that when the wing units are mounted in the housing the twisted direction of the wings of the first wing group are opposite to the twisted direction of the wings of the second wing group to supply different directions of air flow.

2. An air ventilator as recited in claim 1 further comprising a second shaft, wherein said pair of wing units comprise said one wing unit and another wing unit, wherein the second shaft passes through the center aperture of said another wing unit of said pair of wing units, wherein the inner housing is located at rear side of said pair of wing units, and wherein the outer cover is located at a front side of said pair of wing units.

* * * * *